July 17, 1956  S. LUDWIG ET AL  2,755,330
END STRUCTURE FOR ELECTRICAL CONDUIT
Original Filed Jan. 27, 1947  3 Sheets-Sheet 2

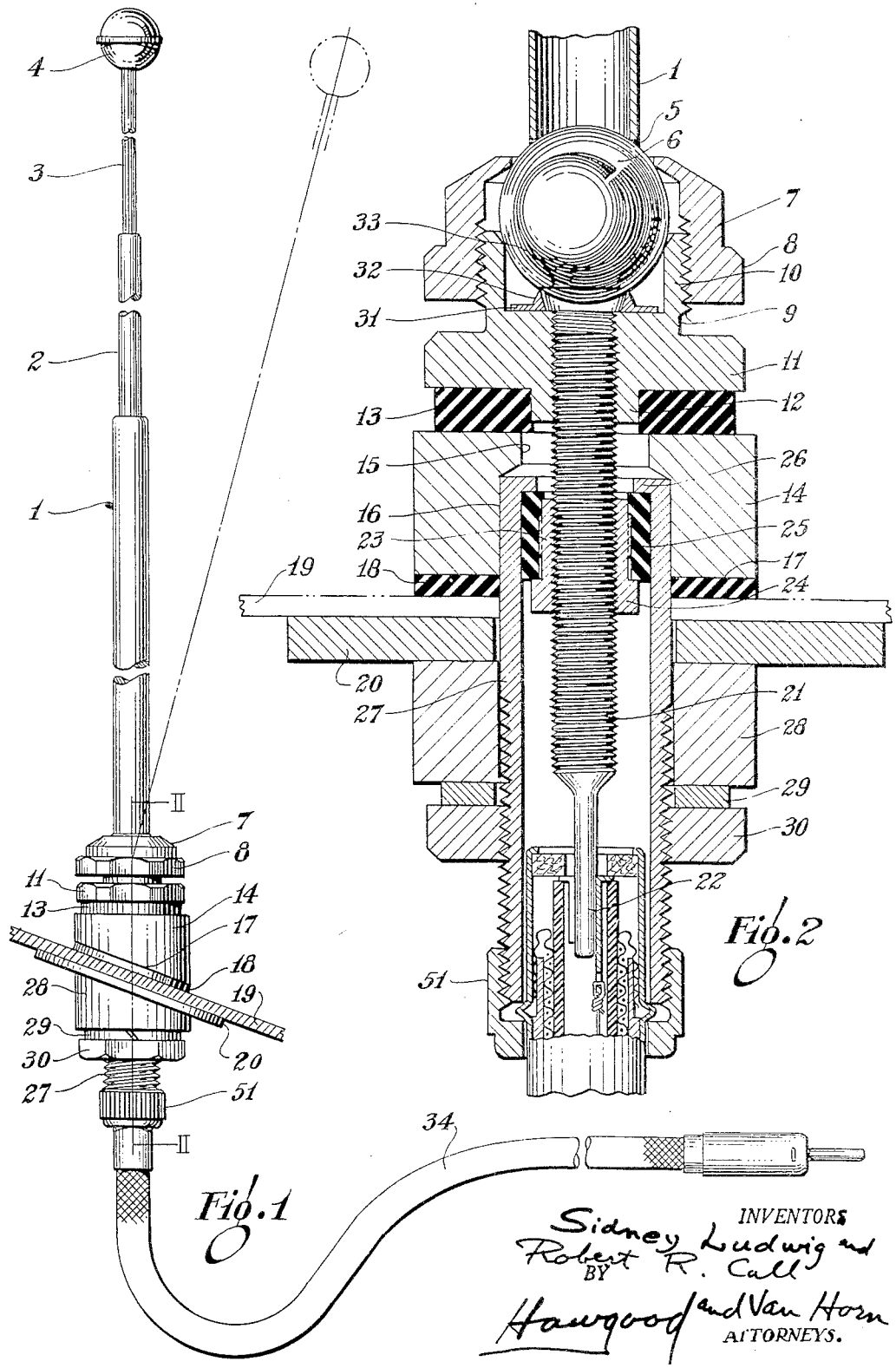

INVENTORS
Sidney Ludwig and
Robert R. Cull
BY
Hawgood and Van Horn
ATTORNEYS.

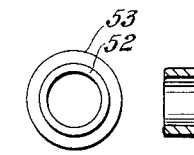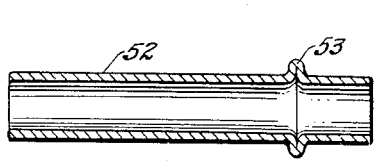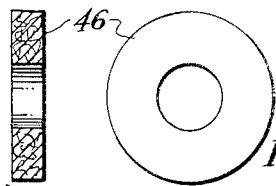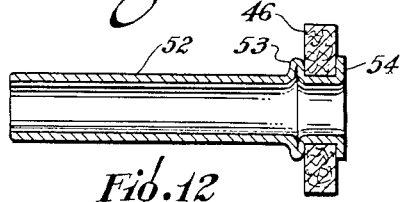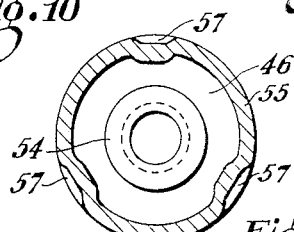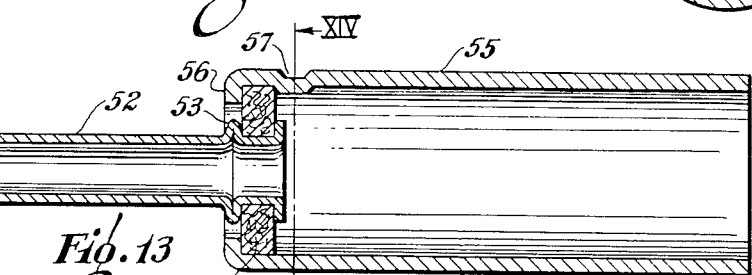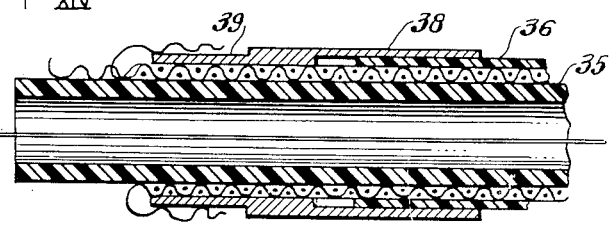

2,755,330
Patented July 17, 1956

United States Patent Office

2,755,330

END STRUCTURE FOR ELECTRICAL CONDUIT

Sidney Ludwig and Robert R. Cull,
Cuyahoga County, Ohio

Original application January 27, 1947, Serial No. 724,634. Divided and this application May 11, 1951, Serial No. 226,434

6 Claims. (Cl. 174—74)

This invention relates to a radio apparatus and a supporting means cooperating therewith.

An object of the invention is to provide an improved electrical conducting and insulating means which will efficiently conduct currents such as those picked up by a radio receiver.

Another object of the invention is to provide an improved conducting apparatus which may be easily and quickly mounted, as for instance on an automotive vehicle.

Another object of the invention is to provide an improved electrical conducting means wherein the parts through which current is conducted are effectively shielded from outside influences.

Another object of the invention is to provide an improved electrical conducting and insulating means which will be neat and attractive in appearance.

Another object of the invention is to provide an improved electrical conducting and insulating means which will be easily assembled.

Another object of the invention is to provide an improved electrical conducting and insulating means which will be composed of few and simply manufactured parts.

This invention will be better understood from the description of one practical embodiment thereof, illustrated in the accompanying drawings, in which:

Figure 1 is a side elevation of a radio antenna mounted upon a part of an automotive vehicle, together with the conductor by which the currents received by the antenna are conducted into the amplifying and detecting part of the apparatus;

Figure 2 is a fragmentary cross sectional view of the supporting parts and associated portions of the antenna of Figure 1 taken on line II—II, and to a much enlarged scale;

Figure 8 is an end elevation of an electrical contact used at the opposite end of the conduit from that shown in Figures 3 to 7;

Figure 9 is a longitudinal central sectional view of the contact of Figure 8;

Figure 10 is a cross sectional view of an insulating washer used in conjunction with both terminals of the conduit;

Figure 11 is an elevational view of the washer of Figure 10;

Figure 12 shows the manner of assembling the contact of Figures 8 and 9 with the washer of Figures 10 and 11;

Figure 13 shows the parts of Figures 8 to 12 assembled with a ferrule for application to the insulating conduit and conductor;

Figure 14 is a transverse sectional view taken on the line XIV—XIV of Figure 13;

Figure 15 is a view similar to Figure 4, but showing the other end of the conduit and conductor as prepared for the reception of the parts of Figure 13; and Figure 16 shows the finished end of the conduit.

Figure 3:
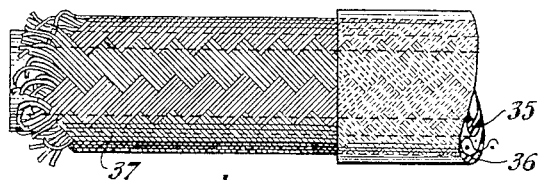
Figure 3 is a fragmentary view of the end of an insulating conduit indicated in general in Figure 1, to a still further enlarged scale, showing the first step in forming a terminal for connection of the conduit to the antenna parts shown in the preceding figures.

In Figures 1 and 2 an antenna is shown consisting of three telescopically arranged tubes 1, 2 and 3, the upper end of the upper of these parts being shown as finished with a knob 4, and the lower end of the lower tube being shown as permanently fixed, as by welding 5, to a metal ball 6.

This antenna is mounted upon an automotive vehicle, as upon the cowl, a fender, the top or the like, as well understood in this art, so that it may be extended upwardly to intercept radio waves and conduct them to a receiving set within the car.

It is necessary that the antenna be firmly supported, as it is subjected to the rush of air as the car travels and at times to the impact of rain, snow, falling leaves, and even branches, and at the same time, of course, it must be efficiently electrically insulated from the body of the vehicle by which it is carried.

The clamping means about to be described accomplishes both purposes and avoids the necessity for supplemental supporting means which are common in present types of antennae for vehicles.

Slid over the tubular portion of the antenna and engaging upon the upper portion of ball 6 is a perforated cap 7, provided on its exterior with flattened or other tool engaging surfaces 8 and on its interior with a thread which engages the external thread 9 on a tubular flange 10 formed on the upper side of a nut-like member 11.

The member 11 has a depending boss 12 which fits within the central aperture of a solid insulating washer 13.

The lower surface of the washer 13 rests upon a cylinder block 14, centrally perforated as indicated at 15 and having an enlarged or counterbored recess section 16.

It will be noted that the bottom surface of the block 14 is formed along a plane, as indicated at 17, which is oblique to the axis of the block, to permit the fitting to be adjusted to the inclination of that portion of the vehicle upon which the apparatus is mounted.

Beneath the block 14 is a shock absorbing washer, conveniently of soft rubber, indicated at 18, while a portion of the vehicle cowling, body or the like, to which the antenna is attached is indicated at 19.

Bearing upon the under surface of the cowling is a washer 20, which may be of metal or other rigid material, it being unimportant as to whether this be insulating or conducting material, but preferably that it be quite firm.

Threaded into the nut 11 is a centrally extending threaded rod 21 terminating at its lower end in a reduced shank 22, and threaded upon the rod is a sleeve 23 having an enlarged head 24 which bears upon the lower end of an insulating bushing 25.

The upper end of this bushing bears on the under side of an inwardly directed flange 26 of a tubular sleeve 27.

The flange 26, in turn, bears upon the shoulder formed within the block 14 at the juncture of bore 15 and counterbore 16 and so clamps nut 11 and block 14 tightly upon the opposite sides of the insulating washer 13, while at the same time it will be noted that nut 11 and the antenna parts carried thereby are very effectively electrically insulated from the block 14 and from the sleeve 27.

The lower end of sleeve 27 is externally threaded and passes through a cylindrical block 28, washer 29 being provided below the block, and the washer being engaged by a nut 30 threaded on the sleeve.

The block 28 has an upper beveled surface corresponding substantially to the beveled surface 17 of block 14, and, bearing upon the under side of washer 20, tightly clamps the car cowling 19 between washers 18 and 20.

Within the cylindrical recess in flange 10 is positioned a washer which serves the dual purpose of accurately holding antennae 1, 2 and 3 at the desired angle to the supporting bracket and of electrically connecting this antenna to threaded rod 21. This washer is shown as having a flat ring-like portion or flange 31 unitarily united with an axially projecting V-shaped or sharp edged circular flange 32.

The washer is positioned in the bottom of the recess formed in flange 10 with its sharpened annular edge extending upwardly and bail 6 is placed thereon. Upon tightening of the cap 7, the ball is pressed downwardly upon the sharpened edge 32, which edge cuts into the metal of the ball forming a circular groove (indicated at 33) which firmly unites the ball and washer both mechanically and electrically. The washer simultaneously is forced against the bottom of the chamber in nut 11, which in turn is threaded on to rod 21, and so in good electrical connection therewith.

It has been found in practice that the washer cuts quite a noticeable groove in the ball, to the extent that it is hard to separate the two parts after cap 7 has been tightly clamped down, and obviously the engagement of the washer over the relatively large periphery of the circle 33, together with the fact that this circle is relatively remote from the axis of antenna 1, gives it a very firm support.

It will be noted that the bushing 25 is supported on the outside by sleeve 27, at its upper end by the flange 26 of this sleeve, and on its inside and lower end by the bushing 24.

Consequently a great deal of pressure may be applied to the insulator 25 which cannot be subjected to anything other than compressive force.

Similarly, the washer 13 is supported on its top and bottom by nut 11 and block 14, respectively, and internally by the depending boss or flange 12, and moreover has relatively large areas in contact with the nut and block so that it also may be subjected to relatively great pressure.

Thus the nut 11, block 14, and sleeve 27 are very rigidly connected mechanically, while the nut 11 and its associated parts are effectively electrically insulated from the block and sleeve.

The part of the car to which the device is attached is gripped tightly between clamping blocks 14 and 28, and the pressure on its underside is distributed even further by means of the washer 20 so that in practice it is impossible to move the support without actually bending car part 19.

The rigidity of this structure eliminates the need for additional braces which are used on nearly all prior types of antennae.

Secured to the depending shank 22, to conduct the impulses received by the antenna to the receiving set, is a conductor indicated generally in Figure 1 at 34, but more clearly shown in enlarged detail in Figures 3 to 16, the end which is connected to the shank being shown in Figures 2 to 7.

The conductor itself is inclosed in inner and outer insulating tubes 35 and 36 between which is a woven tube of conducting material 37. The tubes 35 and 36 are most conveniently formed of some of the more flexible plastic materials, such as polyethylene and the woven portion 37 of small metallic wires.

Figure 4:
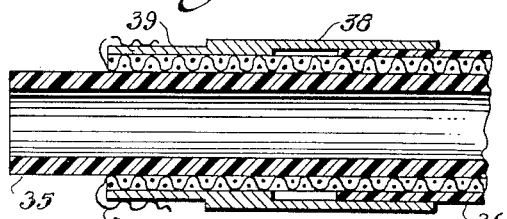
Figure 4 is a central sectional view of the conduit end of Figure 3, showing a further step in the manufacture of this terminal.
Figure 5:
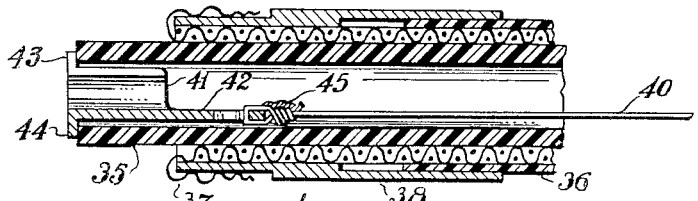
Figure 5 is a view similar to Figure 4 showing the addition of the terminal connector and electrical conductor as these are applied to the insulating conduit.
Figure 6:
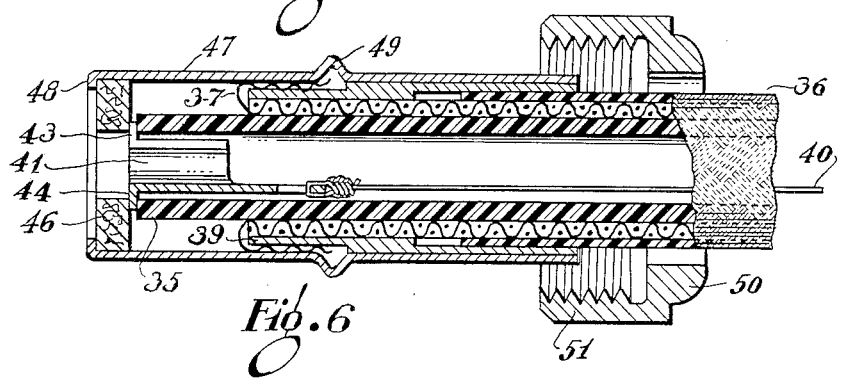
Figure 6 is a view similar to Figures 4 and 5 showing the finished end of the conduit.

In Figure 3 the outer tube 36 is shown as cut back a substantial distance from the end of the inner tube 35, which is the first step in forming the connector end. After this, a ferrule consisting of a larger cylindrical flange 38 and a smaller flange 39 unitary therewith is slid over the tubes and the ends of the woven metal portion 37 are unravelled and spread back over flange 39, as indicated in Figure 4.

Figure 7:
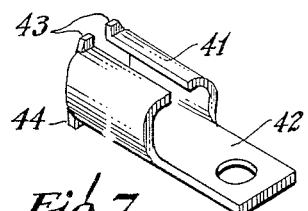
Figure 7 is an enlarged perspective view of the electrical terminal appearing in Figures 5 and 6.

Next, a conducting wire 40 is passed through the inner tube 35, its end being secured to a spring clip, indicated in Figure 7 as comprising a split resilient tubular portion 41, a perforated shank 42, and outwardly turned lugs 43 and 44, is attached to the end of the wire as by bending the end of this wire through the perforation in shank 42 and then soldering it to the shank as indicated at 45.

A perforated disc shaped insulating washer 46 is next placed over the lugs 43 and 44 and a ferrule 47 is pressed over the end of the tubes, tightly engaging the exterior of flange 38.

It will be noted that the ferrule has an inturned flange 48 engaging the washer 46 and holding this tightly against the connector lugs and has a peripheral flange or rib 49 which may be engaged by the inwardly extending flange 50 of a threaded cap 51.

To connect this end of the conductor to shank 22 it is merely necessary to slide it over the shank, the shank itself being gripped by the cylindrical portion 41, and then to screw the cap 51 on the lower threaded end of sleeve 27 which prevents the conductor from accidentally being pulled out and also grounds the woven covering 37 to the vehicle body part 19.

The manner of making the terminal at the other end of the conductor is shown in Figures 8 to 16 inclusive, the contact of this terminal itself being formed from a small cylindrical tube 52 as shown in Figures 8 and 9, on which is formed an annular rib or bead 53 closer to one end than the other.

A cylindrical insulating washer 46, such as used at the other end of the conductor, is slid over the shorter cylindrical end as indicated in Figure 12 and this end flanged outwardly at 54 to clamp the washer firmly to the contact between the flange 54 and rib 53.

Next the washer is inserted in the end of a ferrule 55 with the contact 52 projecting from the end of the ferrule at which is formed an inturned flange 56, and the ferrule is indented as indicated at 57 to clamp the parts tightly in place.

The end of the tubular conduit is prepared in substantially the same manner as shown in Figure 3, by stripping away a part of the outer tube 36, sliding a ferrule consisting of a larger flange 38 and a smaller flange 39 over the woven layer of the conduit, turning back the end of this conducting layer upon flange 39, and then the assembly consisting of contact 52, washer 46 and ferrule 55 is slid over these parts, the end of wire 40 being passed through the tubular contact 52.

The end of this contact is closed and connected to the wire 40 by a drop of solder 58 and any excess of wire is cut off.

It will be apparent that with the parts assembled as shown in Figure 1, the wire 40 is in good electrical contact with antennae 1, 2 and 3, while all space within the antenna support and within the insulating tubes 35 and 36 is sealed against the entrance of moisture, dirt or conducting material of any kind, while at the same time the woven shielding 37 is grounded to the sleeve 27 and through this to the vehicle body 19.

This application is a division of an application filed by applicants January 27, 1947, Serial No. 724,634.

While we have described the illustrated embodiment of our invention in some particularity, obviously many other embodiments, variations and modifications will readily occur to those skilled in this art, and we do not therefore limit ourselves to the precise details shown and described, but claim as our invention all embodiments,

We claim:

1. A conduit for the conduction of electrical currents comprising a conducting wire extending through an insulating three-ply sheath comprising, inner and outer tubular plies made of insulating material and an intermediate tubular ply of flexible conducting material, a sleeve extending over a portion of said intermediate ply and an end of said outer ply, a portion of said intermediate ply being out-turned to lie over the exterior of said sleeve, a second sleeve secured to the exterior of the first mentioned sleeve and clamping between them the out-turned portions of said intermediate ply, a connector attached to said conducting wire and projecting into an end of said inner tubular ply, the second mentioned sleeve formed to retain said connector in the said end of the inner tubular ply.

2. A conduit for the conduction of electrical currents comprising a conducting wire extended through an insulating three-ply sheath comprising, inner and outer tubular plies made of insulating material and an intermediate tubular ply of flexible conducting material, a sleeve extending over a portion of said intermediate ply and an end of said outer ply, a portion of said intermediate ply being out-turned to lie over the exterior of the first mentioned sleeve, a second sleeve secured to the exterior of the first-mentioned sleeve and clamping between them the out-turned portions of said intermediate ply, the end of said second sleeve having secured therein an insulating washer, and a tubular contact having a portion engaged between said washer and the adjacent end of said inner tubular ply and spaced from said sleeve and connected to said wire.

3. The combination with a radio antenna having an output terminal comprising an elongated shank, of a connector adapted to be connected to said shank at one end thereof for conveying signals from said antenna to a radio set, said connector comprising a sheath of three concentric tubular plies of material, the inner and outer plies being of insulating material, and the intermediate ply being of flexible electric conducting material, said inner ply having a bore therein for receiving at one end a shank-engaging clip, a shank engaging spring clip extending into said bore and having a flange overlying an end of said inner ply, a sleeve extending over a portion of said intermediate ply and an end of said outer ply, a portion of said intermediate ply of flexible conducting material being outturned to lie over the exterior surface of the said sleeve, a second sleeve having frictional engagement with and positioned over said first sleeve and having an end projecting beyond that end of the conductor housing said spring clip, said projecting end forming thereon an inwardly turned peripheral flange, a conductor secured to said spring clip and lying within and along the bore of said inner ply, and a perforated insulating member in axial alignment with said spring clip and lying between the peripheral flange of the second sleeve and the flange of said clip to position and hold said clip in said bore when the second sleeve is rigidly secured to the first named sleeve.

4. The combination with a radio antenna having an output terminal comprising an elongated shank, of a connector adapted to be connected to said shank at one end thereof for conveying signals from said antenna to a radio set, said connector comprising a sheath of three concentric tubular plies of material, the inner and outer plies being of insulating material, and the intermediate ply being of flexible electric conducting material, said inner ply having a bore therein for receiving at one end a shank-engaging clip, a shank engaging spring clip extending into said bore and having a flange overlying an end of said inner ply, a sleeve extending over a portion of said intermediate ply and an end of said outer ply, a portion of said intermediate ply of flexible conducting material being outturned to lie over the exterior surface of the said sleeve, a second sleeve having frictional engagement with and positioned over said first sleeve and having an end projecting beyond that end of the conductor housing said spring clip, said projecting end forming thereon an inwardly turned peripheral flange, a conductor secured to said spring clip and lying within and along the bore of said inner ply, a perforated insulating member in axial alignment with said spring clip and lying between the peripheral flange of the second sleeve and the flange of said clip to position and hold said clip in said bore when the second sleeve is rigidly secured to the first named sleeve, said second sleeve having a peripheral portion upset outwardly thereof, and a member carried by said conductor and movable over the second sleeve to engage said upset portion when said member is in position to clamp the connector in conducting relation with said antenna.

5. A conduit for the conduction of electrical currents comprising a conducting wire extending through an insulating three-ply sheath comprising inner and outer tubular plies of electrical insulating material and an intermediate tubular ply of flexible electrical conducting material, said inner ply of insulating material having a bore therein for receiving said conducting wire, a spring clip electrically connected with an end of said conducting wire, said spring clip having outturned portions overlying an end of said inner insulating tubular ply, a sleeve extending over a portion of said intermediate tubular ply and an end of said outer insulating ply, a portion of said intermediate ply being outturned to lie over the exterior of said first mentioned sleeve, a second sleeve secured to the exterior of said first mentioned sleeve and clamping between them the outturned portions of said intermediate tubular ply, and an insulating washer secured in the outer end of said second sleeve, said outturned portions of said spring clip being also engageable by said washer.

6. A conduit for the conduction of electrical currents comprising a conducting wire extending through an insulating three-ply sheath comprising inner and outer tubular plies of electrical insulating material and an intermediate tubular ply of flexible electrical conducting material, said inner ply of insulating material having a bore therein for receiving said conducting wire, a spring clip electrically connected with an end of said conducting wire, said spring clip having outturned portions overlying an end of said inner insulating tubular ply, a sleeve extending over a portion of said intermediate tubular ply and an end of said outer insulating ply, a portion of said intermediate ply being outturned to lie over the exterior of said first mentioned sleeve, a second sleeve secured to the exterior of said first mentioned sleeve and clamping between them the outturned portions of said intermediate tubular ply, and an insulating washer secured in the outer end of said second sleeve, said outturned portions of said spring clip being also engageable by said washer, said spring clip being supported between said washer and the adjacent end of said inner insulating ply axially of and spaced from said inner ply.

References Cited in the file of this patent

UNITED STATES PATENTS

| 2,173,643 | Moser | Sept. 19, 1939 |
| 2,265,998 | Bruno | Dec. 16, 1941 |
| 2,671,127 | Hope | Mar. 2, 1954 |

FOREIGN PATENTS

| 537,968 | Great Britain | July 15, 1941 |